April 26, 1955
F. W. RIEHL
2,707,239
APPARATUS FOR UTILIZING WASTE HEAT
Filed Dec. 20, 1948
3 Sheets-Sheet 1
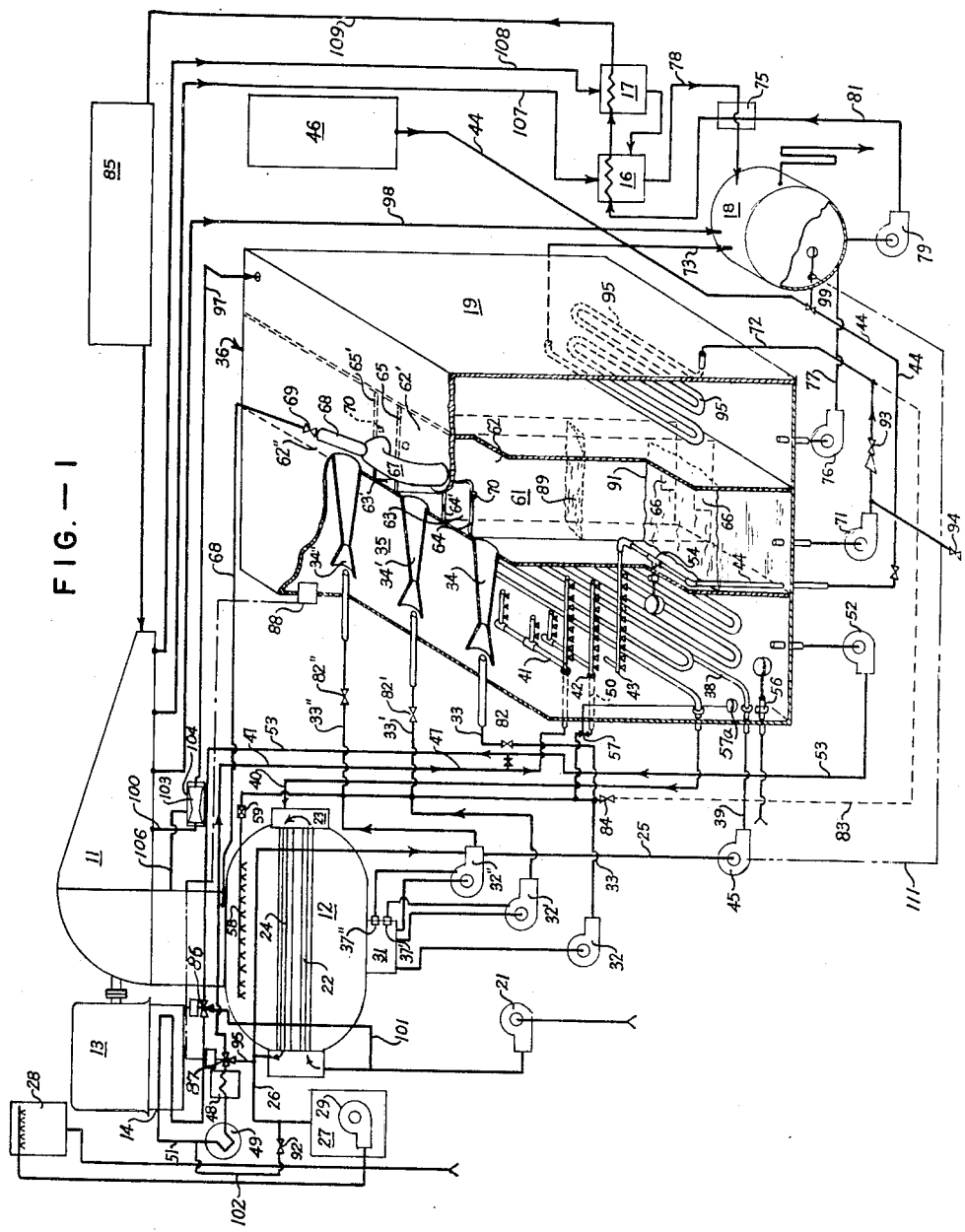
FIG.—1
INVENTOR.
Frederick W. Riehl
BY
*W. A. McGrew*
ATTORNEY

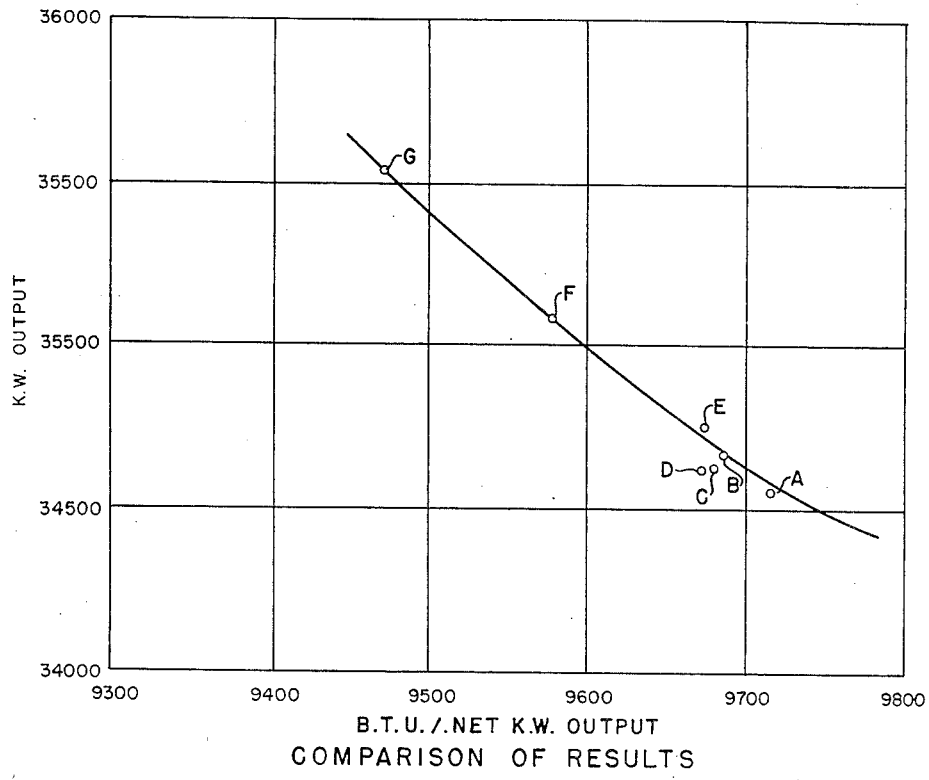
COMPARISON OF RESULTS
FIG.— 2

April 26, 1955
F. W. RIEHL
2,707,239
APPARATUS FOR UTILIZING WASTE HEAT
Filed Dec. 20, 1948
3 Sheets-Sheet 3
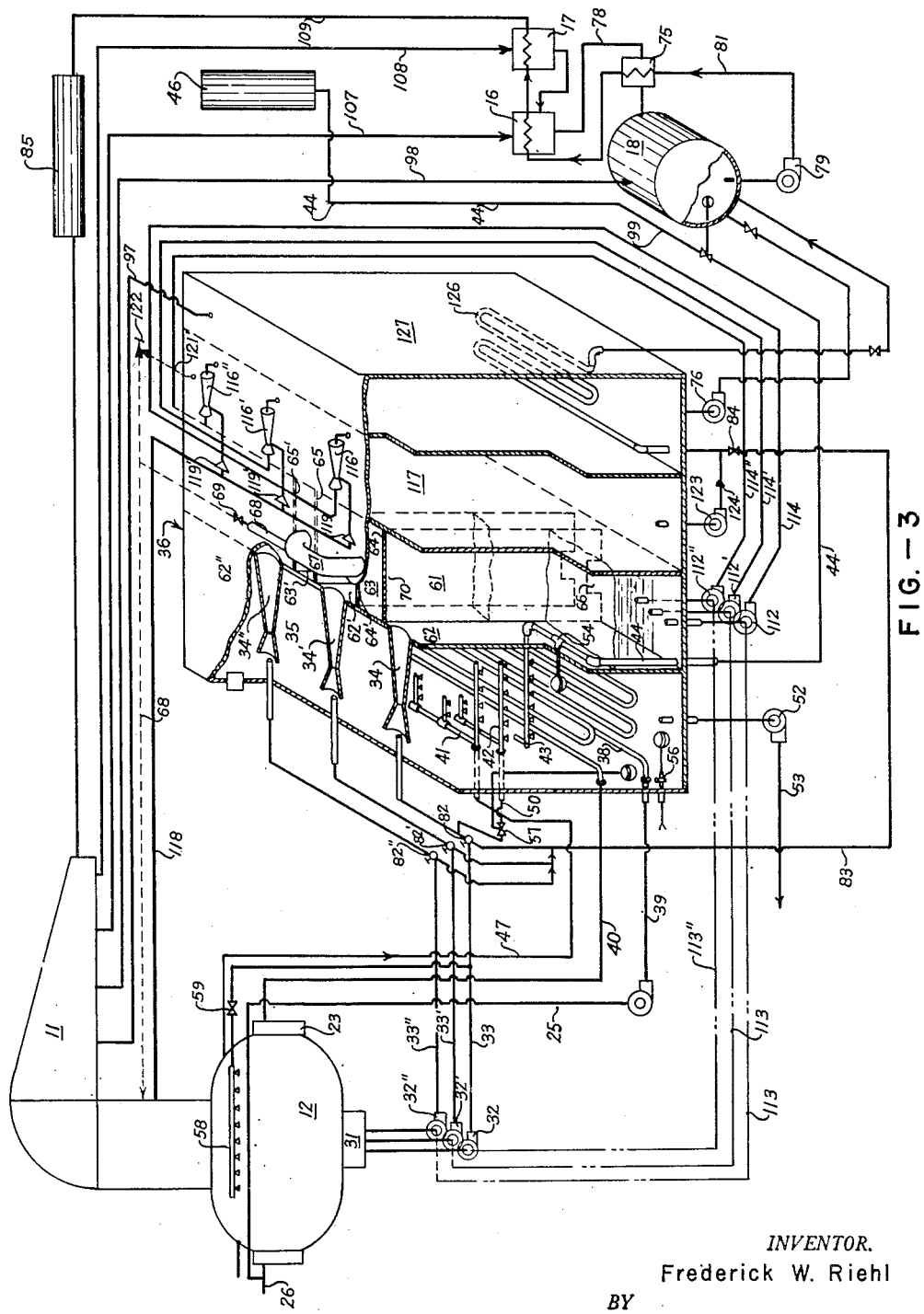
FIG.—3
INVENTOR.
Frederick W. Riehl
BY
*W. A. McGrew*
ATTORNEY

2,707,239

APPARATUS FOR UTILIZING WASTE HEAT

Frederick W. Riehl, Denver, Colo.

Application December 20, 1948, Serial No. 66,374

13 Claims. (Cl. 290—2)

My invention relates to improvements in regenerative heat cycles, such as the cycles preferably employed in the operation of modern steam-driven turbo-electric generators and specifically includes the provision of novel apparatus and methods for incorporation in the cycle.

Steam-driven turbo-generators constitute one of the principal sources of electric power in the United States today and are usually of substantial capacity. Because of the relatively large size of these units, great savings can be made in operation if the efficiency is increased even a fraction of a per cent, with the result that a great deal of research and development has been carried on with respect to the design and operation of such units.

Modern installations are considered by those skilled in the art to be highly efficient and, in recent years, the changes or improvements which have been accomplished have resulted in savings of mere fractions of a per cent. To accomplish these savings turbine blading has been improved, and a complex array of additional auxiliary apparatus has been added such as feed water heaters, make-up water evaporators, heat exchangers, drain coolers, etc., with the result that the cost of these installations and the maintenance of them has been increased materially. By the proper application of my improved heat cycle and apparatus, I am able to substantially increase the efficiency of even the most efficient of these modern turbo-generator installations.

Modern turbo-generators invariably employ large surface type condensers connected to the turbine exhaust for maintaining a relatively low absolute back pressure. In addition, they now utilize many feed water heaters for heating the condensate discharged by the condenser before returning the condensate to the boilers so as to reduce the size of boiler required. To reduce boiler maintenance costs, a feed water evaporator is invariably employed. In all instances, the installation will also include a generator air cooler, which maintains the electrical generator at a predetermined temperature level during its operation. The principal heat loss in these installations is in the condenser cooling water circuit, which is employed to condense the steam exhausted into the condenser by absorbing the latent heat of the steam and thus maintaining a low absolute pressure in the condenser. Because of the necessity of maintaining a low absolute pressure, substantial quantities of water are passed through this condenser cooling circuit in which the temperature of the water is increased only by 10°–20° F. The heat absorbed from the exhaust steam by this condenser cooling water is normally dissipated, either by discharge to a river or by cycling the water through a spray pond, cooling tower, artificial lake, or the like. The heat thus extracted often amounts to more than 50% of the total heat input for the plant heat system, and it has been accepted in the past as an inevitable loss due to the relatively low temperature head of the discharged water.

I have devised a method and apparatus for effectively utilizing at least a portion of this normally wasted heat and for returning this heat to the heat cycle, and, in addition, for conserving additional heat from other sources which is also customarily dissipated in a similar manner, as for example, the heat from the generator air cooler or the oil cooler circulating water system. In normal operation, my compact inexpensive apparatus is automatic in operation and substantially increases the overall efficiency of the cycle by 1% or more. In addition, by utilization of my apparatus and method, a substantial portion of the otherwise necessary auxiliary apparatus may be eliminated and the life of other components of the system substantially extended.

In brief, my invention deals primarily with the portion of the heat cycle and apparatus conventionally disposed between the prime mover's exhaust or main condenser and the deaerator, in which area the exhaust steam, initially at sub-atmospheric pressure, is converted into condensate at superatmospheric pressure. My apparatus functions to transfer heat conventionally dissipated by the condenser cooling water and the generator air cooler to the condensate system, thus reducing the amount of useful heat normally required to raise the temperature of the condensate to a temperature satisfactory for introduction into the boilers. This heat transfer is made possible by pumping a portion of the heated condenser cooling water through a heat exchanger disposed in a container maintained at sub-atmospheric pressure and by passing over this heat exchanger make-up water, condensate, or water from the generator air cooler circulating water system. Since the absolute pressure in this area is maintained at an extremely low value, the water entering the container is converted into vapor by its heat and/or heat extracted from the condenser circulating cooler water system, which is in turn cooled, due to the conversion of water added to the container into vapor. Stated in other words, I employ the sensible heat of the condenser cooling water system to convert water into vapor at sub-atmospheric pressure conditions. The vapor generated is withdrawn from the container by the action of a condensate jet or jets which also serve to maintain the necessary sub-atmospheric pressure condition within the container. This condensate jet is actuated by the kinetic energy of the condensate extracted by pumps from the hot well of the main condenser and driven through one or more jets. The condensate is discharged into an area where the pressure is maintained at approximately five times the pressure existing in the first container, thus insuring completion of condensation of the vapor and the conversion of the latent heat of the vapor into sensible heat by admixture with the condensate, which may then be further heated and cycled to the boilers.

In practice, I have found that, by the use of my system, I can conserve 20% of the total heat usually added to the condensate as it passes from the hot well of the condenser to the deaerator, thus conserving an equivalent amount of useful steam ordinarily required for this purpose. Because of its highly compact and efficient design, this new heat cycle may be incorporated in either new or existing installations and does not require the use of a turbine having an unusually large number of bleed points for efficient operation.

My apparatus includes a shell in which is housed an evaporator containing a heat exchanger for the circulating condenser cooling water and the condensate jets. Also within the container is an accumulator into which the jets discharge and in which the heated condensate accumulates. I prefer to also include within the shell a condensate heater through which condensate from the accumulator is passed enroute to the deaerator.

Suitable sprays for makeup water, condensate, and circulating generator air cooler water are disposed within the evaporator above the heat exchanger, which may be exposed to the sprays or immersed in the condensed liquid as desired. The desired subatmospheric pressure sure in the accumlator is conveniently maintained by connecting the accumulator to the main condenser through a vent control valve.

It should be understood that because of the low subatmospheric pressure conditions maintained within the evaporator, the temperature of the vapors created therein will be of lower temperature than the condensate passing through the water jets, with the result that the vapors are not condensed instantly by contact with the condensate, but rather the vapor will be compressed in its passage through the jets. Condensation is effected primarily by variation of pressure rather than by cooling, although heat exchange occurs between the vapor and the condensate. Since the jet compresses the vapor, its temperature is increased above that of the condensate, and it may therefore be condensed by the condensate, principally after discharge into the accumulator, provided the absolute pressure maintained in the accumulator exceeds the vapor pressure of the mixture of condensate and vapor discharged by the jet. This operation adds to the condensate the latent heat of the vapor, which was originally extracted from the condenser cooling water or other source of normally wasted heat.

When in operation, the hot water sprayed into the evaporator will instantly flash into vapor, at least in part, due to the heat of the water in relationship to the low pressure maintained in the evaporator, this being particularly true in the case of water introduced into the evaporator from the generator air cooler water circuit. The surplus water which is not converted into vapor is, of course, cooled by evaporation and then strikes the heat exchanger where a further partial conversion into vapor occurs. Obviously, the circulating condenser cooling water within the heat exchanger is also cooled in this process and may be recycled to the condenser for further heating by exhaust steam. The water not vaporized in the evaporator will be cooled by evaporation during its passage through the evaporator and may therefore be recycled through the generator air cooler to extract further heat and again pass through the evaporator, the same being true of heated water obtained from other suitable sources in the installation.

By passing all makeup water through the evaporator, the boilers are insured an adequate supply of distilled makeup water, which greatly rduces boiler maintenance costs. Inasmuch as the load upon the turbine varies from day to day and from hour to hour in some instances, I prefer to employ a number of condensate jets, each of which discharges into a separate, self-sealing accumulator compartment. These jets are preferably actuated by pumps connected to the condenser hot well and controlled by float-type switches which bring the pumps into and out of operation in sequence as the level of condensate in the hot well rises or falls.

Although my device may be used as an additional unit supplementing the conventional accessories, it is preferably employed to replace a substantial number of feed water heaters, a make-up water evaporator, and, in some instances, several heat exchangers. This not only reduces the number of cubic feet required to house the installation, but will increase the overall efficiency or heat rate of the cycle from 1% to 3%, depending upon the cycle now in use.

If a cooling tower is required, the load on this piece of apparatus is substantially reduced, since the cooling water that is discharged to it is at lower temperature, this reduction being on the order of several per cent. This particular feature is of substantial importance in instances where the available volume of cooling water is limited or where the temperature of the air is high, as is often the case where artificial lakes or spray ponds are installed in southern areas. The generator air cooler water system is maintained by my heat cycle at a substantially uniform temperature, which markedly extends the generator life and eliminates difficulties often encountered with the unequal thermal expansion of the generator windings. I have found that sufficient heat is available from the generator air cooling system and from the condenser circulating cooling water system as utilized in my cycle to effectively evaporate all the necessary makeup water required in the normal plant, thus eliminating the need for a separate feed water evaporator and insuring an adequate supply of distilled water for makeup purposes.

In view of the foregoing, a primary object of my invention is to provide a regenerative heat cycle of improved efficiency for steam driven prime movers.

Further objects include the provision of suitable apparatus and a method for utilizing such apparatus in a regenerative heat cycle for a steam driven prime mover in such manner as to increase the quantity of heat converted into a mechanical or electrical energy, to provide apparatus which will eliminate the need for several heat exchangers, to provide apparatus which will reduce the quantity of heat to be dissipated by the condenser cooling water circuit and to provide means in such apparatus for evaporating the makeup water required by the cycle without the installation of additional apparatus for such purpose.

Other objects include the provision of apparatus for use in a regenerative heat cycle between the main condenser and the boilers which occupies only a relatively small amount of space, which incorporates a feed water heater, and which eliminates the need for a substantial quantity of piping and pipe connections.

The many advantages, as well as further objects, of my invention will be more clearly understood and appreciated by reference to the following detailed description and from the appended drawings in which:

Fig. 1 is a diagrammatic partial perspective illustration of my heat cycle and apparatus incorporating my invention;

Fig. 2 is a chart indicating the relative efficiencies of modern turbogenerator installations and various modifications of my invention; and Fig. 3 is a diagrammatic partially perspective view of a modified form of my invention similar to Fig. 1, but incorporating only a portion of the standard apparatus shown in Fig. 1.

I have shown diagrammatically in Fig. 1 my new heat cycle as applied to a modern turbogenerator installation which includes a multiple stage turbine 11 exhausting into a condenser 12. An electrical generator 13 is coupled to the turbine 11 and is provided with a generator air cooler, generally designated 14, which may comprise a tubular heat exchanger of conventional design through which air is forced to cool the generator when in operation. Effective performance may also be attained by employing hydrogen cooling for the generator. By way of example, generator 13 may have an output of 35,000 kw., which will require approximately 298,000 lbs. of steam per hour at the turbine throttle valve at 900° F. Under these conditions, about 228,270 lbs. of steam per hour are delivered by the turbine exhaust to the condenser 12, the difference between the input and exhaust steam being accounted for by bled steam consumed by feed water heaters 16 and 17, a deaerator 18 and a heater 19.

The condenser 12 is cooled by water obtained from a suitable source, such as a river, lake, cooling tower or artificial pond. Condenser cooling water is forced by a pump 21 through a first pass of tubes disposed in the condenser 12 to a return water box 23, then back through a second or upper pass 24 of condenser tubes to a discharge pipe 26 communicating, for example, with a discharge well 27 or other means, such as a river or like. A cooling tower 28 may be provided to reduce the temperature of the condenser cooling water, if recirculation is intended, and thus prevent an undue temperature rise in the cooling water with its attendant loss of vacuum in the condenser. The cooling tower 28 is supplied with water through a pump 29 disposed in the discharge well 27, it being understood if a river or like is available, the condenser cooling water from the pipe 26 may be discharged directly to the river without passage through the discharge well 27 or the cooling tower 28.

The circulating condenser cooling water circuit should be capable of maintaining an absolute average pressure of about 1.5 inches of mercury or less within the main condenser 12, and in the case of a 35,000 kw. installation will require about 30,000 gallons of water per minute at a temperature of 73° F., as well as the provision of about 30,000 square feet of condensing surface. The exhaust steam when condensed to liquid within the condenser 12 is collected in a hot well 31 to which at least one and preferably three pumps 32, 32' and 32" are connected. Pump 32 operates continuously to deliver condensate from the hot well 31 at about 91.7° F. through a pipe 33 to a water jet 34 disposed in an evaporator 35 forming part of a container 36, the other pumps 32', 32" being connected by similar pipes 33', 33" to similar jets 34', 34", also within the container 36. Each jet as illustrated constitutes a jet pump and comprises a Venturi tube having a vapor inlet in communication with the evaporator chamber 35 and an outlet through the evaporator wall and arranged so that the water jet from the corresponding one of the pumps 32, 32', 32" is directed through the tube toward the outlet. Float valves or electrical contacts 37', 37" are disposed at various levels in the hot well to control the starting and stopping of the pumps 32', 32" as the water level of condensate in the hot well rises and falls. Within the sealed evaporator chamber 35 is a closely nested tubular heat exchanger 38 disposed below the jets 34, 34', and 34" and having an inlet pipe 39 and a pump 45 connected by a pipe 25 with the main condenser circulating cooling water discharge, as for example to pipe 26. Suitable tube cleaning jets for the heat exchanger 38 may be incorporated if desired. A discharge pipe 40 connects the heat exchanger 38 to the second pass 24 of the condenser cooling water circuit as through the water box 23. During operation, the temperature of the main condenser circulating cooling water after discharge from the condenser is about 86°, which is therefore the approximate temperature of the water entering the heat exchanger 38. This water is discharged from the heat exchanger 38 at about 870 gallons per minute to the second pass 24 of the condenser 12 at a temperature of 73° F.

Above the heat exchanger 38 I dispose a plurality of spray heads 41, 42, and 43 positioned in such manner as to spray water over the tubes of the heat exchanger 38. The spray 43 is connected by a pipe 44 to a source 46 of makeup water. Spray 41 is connected by a pipe 47 to the generator air cooler water circuit which includes a main steam jet air pump 48 communicating with the oil cooler 49 connected by pipe 51 to the discharge side of the generator air cooler 14. The particular arrangement of apparatus illustrated in this portion of the circuit may, of course, be varied as desired. The spray 42 may be connected by a pipe 50 having a valve 57 to a suitable source of condensate such as the pipe 33 connecting the pump 32 and the water jet 34. A condensate spray 58 may also be mounted in the condenser 12 and connected through valve 59 to condensate pipe 33.

A pump 52 draws water from the bottom of the evaporator 35 and discharges the cooled water at a substantially uniform temperature through a pipe 53 to the inlet of the generator air cooler 14, thus completing the generator air cooler circulating water cycle. During operation, the water discharged from the generator air cooler 14 into the container 36 through the spray 41 will have a temperature of about 83.9° F., which is sufficient to flash a substantial portion of the water into vapor under the pressure conditions maintained within the container and after passage over the heat exchanger 38, the remaining water will be discharged through the pump 52 into the generator air cooling circuit at about 70.4° F., approximately 400 gallons per minute being required to maintain these conditions.

The evaporator 35 is maintained at a low subatmospheric pressure by the water jets 34, 34' and 34", which evacuates the vapor formed in the evaporator. Preferably, the absolute pressure maintained in the evaporator should be about 0.75 inch of mercury which corresponds to a water temperature of 70.4° F., or about 15° F. below the temperature of condenser cooling water entering the heat exchanger 38. Obviously, water entering this area at a temperature in excess of this critical point will be converted to a vapor and the remaining water cooled to the critical temperature which is also controlled by the pressure maintained in the container. The evaporator is provided with a high level float valve 54 connected in the pipe 44 before the spray 43 to control the admission of makeup water as required during operation and prevent flooding. A low level float 57a controls the valve 57 connected in the pipe 50 to supply condensate to the evaporator 35 from the pipe 33 in the event the water level drops at a rate greater than that which can be supplied through the valve 54. I also provide an emergency low level float control valve 56 connected to a suitable source of positive water supply, such as city water. Preferably, one or more of the sprays 58 are disposed in the condenser 12 above the condenser tubes and throttled by a valve 59 which communicates with a suitable source of condensate, as for example, the pipe 33 and may be employed to increase the rate of heat exchange in the upper portion of the condenser.

An accumulator 61 receives the discharge of the jets 34, 34' and 34", each of the jets discharging into the upper portion of jet compartments 62, 62', and 62". These jet compartments are separated by vacuum compartments 63, 63', each defined by spaced walls 64, 64', 65, and 65'. These walls are each provided near their junction with the accumulator bottom with intercommunicating openings 66 permitting relatively free flow of water between the compartments in the accumulator, but below the cooler level. Small vent holes 70 are also provided in the walls near the top of the accumulator to permit the extraction of non-condensible vapors which collect at this point.

The vacuum compartments 63, 63' are connected near the top of the accumulator 61 by a manifold 67 which communicates through a pipe 68 with the condenser 12. A constant differential pressure valve 69 is provided in the vent pipe 68 to control accurately the degree of vacuum maintained in the accumulator 61, it being desirable to hold an absolute pressure of about 3.75 inches of mercury in these compartments during operation, in order to obtain the maximum degree of heat exchange. This pressure, which should be approximately five times the pressure maintained in the evaporator 35, corresponds to a temperature of about 126° F. The relationship of pressures between the evaporator 35 and the accumulator 61 is such as to substantially prevent vaporization of the condensate in the compartment 63 and to insure the condensation of vapor discharged into the compartments 62 by the jets.

A pump 71 draws the heated condensate from the lower portion of the accumulator 61 and passes it through the heater 19 via pipe 72, which in turn discharges into a pipe 73 which communicates with the deaerator 18 or other apparatus requiring heat for process purposes. Alternatively the pump 71 may discharge heated condensate through valve 94 to process use. The heater 19 may be supplied with bled steam directly through a pipe 97 which communicates with a suitable intermediate stage of the turbine, and preferably is constructed integrally with the accumulator and the evaporator 35 to obtain an advantageous heat balance, the entire assembly being formed within the container 36.

Greater efficiency of operation will, however, be obtained by passing the bled steam from the turbine through a pipe 100 into a steam jet 103 disposed within a container 104 and discharges into the pipe 97 which operates the heater 19. The container 104 is connected by pipe 106 with the neck of the condenser 12 and thus operates to extract exhaust steam from the neck of the condenser before entering the condenser. The steam so extracted is heated and compressed by its passage through jet 103 and yields a vapor which has a substantially higher total quantity of heat than the bled steam alone. This occurs because condensation is not effected in the jet 103 and the exhaust steam heat is therefore added to the heat of the bled steam. This vapor discharged into heater 19 is condensed on coils 95 communicating with pipes 72 and 73 and after condensation is extracted by pump 76 communicating with the bottom of the heater 19. The condensate discharged by the heater 19 through pipe 73 to the deaerator 18 will have a temperature in excess of approximately 190° F. and is mixed in the deaerator 18 with the condensed bled steam discharged from the lower portion of the heater 19 by a pump 76 and through a pipe 77 connected to the deaerator 18. Steam is bled to deaerator 18 through a pipe 98 for additional heating of the condensate. Condensed bled steam from the heaters 16 and 17 supplied from the intermediate stages of the turbine 11 by pipes 107 and 108 respectively is also discharged via a pipe 78 through a drain cooler 75 into the deaerator 18, which delivers deaerator condensate to a boiler feed pump 79 through the pipe 81 to heaters 16 and 17 arranged in series. From the heaters, the hot condensate is delivered to the boiler 85 for the generation of turbine steam through pipe 109. Deaerator 18 also includes a float valve 99, which controls the flow of makeup water through pipe 44, and is preferably also connected to pump 45 through wire 111 in such manner that the pump 45 operates when makeup water is added.

The pipes 33, 33' and 33" leading to the condensate jets 34, 34', and 34" are provided with manually controlled valves 82, 82', and 82" for diverting the flow of condensate into a by-pass circuit which includes a pipe 83 connecting the pipes 33, 33', and 33" with the heater 19 through a valve 84, which is opened only when valves 82, 82', 82" are all closed.

Three-way solenoid valves 86 and 87 are also provided in the pipes 53 and 47 of the generator air cooling circulating water circuit to automatically shut off the circulation connection to the unit 14 from the pump 52 and establish an auxiliary circuit to the unit 14 and to the condenser for circulating cool water through the system when the unit is being started and during emergency operation. For this purpose, a pipe 101 may connect the discharge of pump 21 with the valve 86 in parallel with the condenser cooling system 12 and a pipe 95 may be employed to connect valve 87 with the condenser cooling water discharge pipe 26. If desired, a pipe 102 having a drain valve 92 may connect the generator air cooler cooling circuit with the pipe 26 to discharge from the system portions of the water containing concentrated salts or undissolved solids, thus preventing the formation of excessive encrustation or scale in the circuit. A vacuum-pressure responsive control 88 communicating with the evaporator 35 may be employed to control the solenoid valves 86 and 87, as well as other auxiliary equipment or valves for automatically actuating these appliances when the vacuum in the evaporator 35 reaches a predetermined condition.

*Operation*

To initiate operation, the boilers 85 are slowly brought up to the steaming point as usual, and the pump 21 is started to obtain circulation of water in the main condenser cooling water system. Initially, a subatmospheric pressure may be established in the condenser 12 by auxiliary exhauster means, such as the steam jet, if so desired. A quantity of water is admitted to the evaporator 35 during this stage of the operation. Since at this point there is no vacuum in evaporator 35, the pressure switch 88 opens valves 86 and 87 to supply cooling water to the generator air cooler 14 from the main condenser circulating cooling water system through pipe 101. Valves 82, 82', 82", and 93 are closed while valve 84 is open allowing the pump 32 to discharge from the hot well 31 to the heater 19, then to the deaerator 18 and then to the boilers 85, thus by-passing the unit 36.

Steam is passed slowly to the turbine to bring the turbine and auxiliaries up to temperature and is condensed upon discharge from the turbine in the condenser 12. Pumps 52 and 71 are immediately placed in operation, circulating water through the evaporator 35 via pipe 53, pressure-reducing valve 96 and spray 41. As the quantity of condensate available increases, valve 84 is closed and valve 82 is opened, permitting the pump 32 to discharge condensate through the jet 34, and then through pump 71 to heater 19, thus gradually establishing the desired degree of vacuum in the evaporator 35 until the actaution point for the pressure switch 88 is attained. At this time, the control 88 actuates valves 86 and 87 to shut off the connection between the main condenser circulating cooling water system and the generator air cooler 14 and to establish circulation for the generator air cooler 14 through the evaporator 35. The vent valve 69 in the pipe 68 leading to condenser 12 remains open and maintains the desired degree of vacuum in the accumulator 61. Closing valve 84 shuts off the by-pass for condensate and places the unit 36 in full operation.

Because of the low absolute pressure maintained in the evaporator 35, the heated water discharged into the evaporator through the spray 41 from the generator air cooling water system immediately flashes, at least partially, into vapor, since the temperature of the entering water is in excess of the boiling point under the pressure conditions existing in the evaporator. During this period, there exists an almost continuous demand for makeup water, which is supplied to the spray 43 through the valve 99 at the deaerator. The valve 99, even during regular operation, functions to almost continuously admit a small quantity of makeup water; and inasmuch as the valve 99 also controls operation of the pump 45, which pumps heated water from the discharge of the main condenser circulating cooling water system, water will be passed through the heat exchanger 38.

The unvaporized portion of the generator air cooler circulating water discharged into the evaporator 35 through the spray 41 will be cooled to the critical temperature and will then fall onto the heat exchanger 38, where by further heating and vaporization, heat is extracted from the cooling water passing through the heat exchanger 38. Obviously, the water passing through the heat exchanger 38 is cooled by this process and is returned to the second pass 24 of the condenser 12 to further condense exhaust steam in the main condenser 12.

The vapor created in the evaporator 35 is evacuated from the evaporator by the condensate jet 34 which compresses the vapor and discharges it into the accumulator 61. It should be understood that the condensation of the vapors is accomplished primarily by the pressure conditions rather than by a change of temperature as is more frequently the case. The temperature of the condensate passing through the jets 34 is higher than the temperature of the vapor extracted from the evaporator 35, so that condensation of the vapor by the condensate can not occur without alteration of the pressure conditions. It is probable that only a portion of the vapor is condensed by compression during its passage through the jets 34, since the velocity is high and the time available for condensation while the vapor is actually in the jet, is probably inadequate. The pressure, however, is increased sufficiently to insure condensation and since such pressure is maintained in the accumulator 61, the condensation is completed. There is also a certain degree of heat exchange between the condensate and the vapor, as well as heating by compression, which aids this conversion. Since the vapor is converted to a liquid, it is obvious that the latent heat of the vapor is translated into sensible heat and thus increases the heat content of the condensate in the accumulator 61. In actual practice, I can increase the temperature of the condensate approximately 30° F. by this operation and can thus save approximately 20% of the heat otherwise required to raise the temperature of the condensate to a degree suitable for injection into boilers 85. It should be clear at this point that not only is makeup vaporized and converted into condensate, but at the same time the temperature of the water in the main condensate circuit is raised about 30° F.

In the course of operation, a phenomena known as surges will occur due to abrupt cessation of flow in the turbine cycle. For example, if a heavy load is suddenly thrown on the turbine, the deaerator automatically shuts off the supply of makeup water for a short period of time and thus increases the steam capacity of the boilers 85. These surges are momentary in nature and seldom extend over more than a few minutes. However, during such operation makeup water will not be flowing through the line 44 and the pump 45 will therefore not be in operation. This prevents excess vapor being produced in the evaporator and thus avoids unnecessary deaerator overflow. As the load is released, however, the system calls for makeup water and the valve 99 will therefore open, starting pump 45 and forcing water through the heat exchanger 38. This supplies sufficient heat for the operation of the system and for evaporation of the makeup water added through spray 43. If, however, for any reason makeup water is not added for an extended period of time, generator air cooler 14 supplies sufficient heat for operation of the unit 36. Since the water entering the evaporator through the spray 41 is partially converted into vapor and this vapor is removed by the jets 34, the total gallons of water in the generator air cooler circuit is gradually reduced in volume until the float actuates valve 57 and permits condensate to be injected into the evaporator 35 through the spray 42. This supplies sufficient water to maintain the operation of the generator air cooler 14, but does not result in a net addition of water to the system. Flooding does not therefore occur in the deaerator and heat is not lost through the deaerator overflow.

It should be understood that makeup water is required almost continuously during operation of the unit even if in small quantities and that as a result water is nearly always flowing through the heat exchanger 38.

If for any reason the water level in the evaporator 35 should drop to a dangerously low level, float valve 56 opens and admits sufficient water to maintain the operation of the unit. The level of the float is set as desired to control the minimum water level, which may be such as to wholly or partially immerse the heat exchanger 38. I have found that, in general, the most efficient operation will be attained when either the heat exchanger 38 is above water level or is only partially immersed.

Since the accumulator 61 is maintained at a relatively low absolute pressure, the power load on the jets 34 is reduced to a minimum, thus enabling them to perform their function of removing or extracting vapor from the evaporator at maximum efficiency.

In the accumulator 61, it will be noted that the manifold 67 is connected to vacuum compartments 63, 63', with the result that the level of condensate in these compartments indicated at 89 is somewhat higher than the level of condensate in the jet compartments 62, 62', and 62", as indicated at 91, this being due to the pressure differentials existing between the chambers which are relatively slight when all of the jets are operating. When less than all of the jets are in operation, the condensate in the compartments can rise to somewhat higher levels, but the height of the chambers is purposely made sufficient to prevent flow of condensate from the compartments back into the evaporator 35 through the jets which are not in operation. Thus, a water seal is provided which maintains the differential pressure conditions necessary between the evaporator 35 and the accumulator 61. I may therefore operate any one or more of the jets at any time without danger of drawing condensate in a reverse direction.

In practice, I prefer to provide a leak off valve 92 which may be either periodically opened or allowed to remain partially open continuously to remove a predetermined volume of water from the circulating cooling water system for the generator air cooler 14, the amount of water extracted being sufficient to prevent the formation of undue amounts of scale or other encrustations in the system. The jet 103 adds heat to the condensate discharged from the accumulator 61 by compressing and condensing the exhaust steam, and thus extracting its latent heat in heater 19, where it is condensed. Although use of the jet 103 is not essential to my invention, it effects further heat savings and is therefore desirable.

It is, of course, obvious from the foregoing that the unit 36 functions as a makeup water evaporator of adequate capacity to supply the needs of the system, although this function is incidental to its primary function which is to increase the heat content of condensate on its path from the condenser to the boilers without the use of substantial quantities of bled steam otherwise required.

To indicate more clearly the economy which can be attained by the use of my improved heat cycle and apparatus, it may be stated that the turbine heat rate of the unit hereinbefore described is approximately 9260 B. t. u./kw. (gross), which may be compared directly with a modern turbo-generator of comparable size, which in its most modern form has a heat rate of approximately 9560 B. t. u./kw. In the latter installation, six or seven feed water heaters, a deaerator, special makeup water evaporator, and a special generator air cooling system of inferior efficiency must be employed to attain such a heat rate, plus a great deal of additional equipment in the way of pumps and valves for operation. It may therefore be seen that a substantial improvement on the order of 3 per cent has been made in the over all efficiency of such an installation primarily by efficiently utilizing the heat normally wasted in the condenser cooling water circuit and the generator air water cooler circuits. If compared to other similar installations employing five feed water heaters, an over all improvement of about 5 per cent will be noted, and if compared to installations utilizing four feed water heaters, the increase in efficiency will be on the order of 6 to 7 per cent.

In Fig. 2, point A indicates the heat rate of a conventional turbo-generator installation, which includes a drain cooler, six feed water heaters, a low pressure deaerator, a turbine having six bleed points and steam driven pumps.

Point B indicates the heat rate of a similar modern turbo-generator installation of conventional design incorporating an evaporator, steam driven pumps, a turbine having six bleed points, a low pressure deaerator, and seven feed water heaters, one of these being employed in connection with the evaporator, but which does not incorporate a drain cooler.

Point C represents a conventional turbo-generator installation having four bleed points on the turbine and four feed water heaters, a drain cooler, a high pressure deaerator, and electrically driven pumps.

Point D represents a modern turbo-generator installation of conventional design having a high pressure deaerator, a turbine with four bleed points, four feed water heaters, a drain cooler, and steam driven pumps.

Point E indicates the heat rate of a turbo-generator installation substantially similar to that illustrated in Fig. 1, which utilizes the water jets 34 and the steam jet 103, but operated without a drain cooler. The pumps are electrically driven, three feed water heaters are employed and a high pressure deaerator is incorporated. The turbine is standard, having four bleed points and of course the incorporation of the evaporator 35 is inherent in my cycle.

Point F indicates the efficiency of an installation similar to that indicated at point E, but which incorporates a drain cooler and four feed water heaters.

Point G indicates the efficiency of a cycle similar to that illustrated in Fig. 3, wherein jets 116 are employed in series with the jets 34, and which incorporates a drain cooler, electrically driven pumps, a high pressure deaerator, a standard turbine with four bleed points, and four feed water heaters, the evaporator as previously indicated being inherent in my apparatus.

In the calculation of these efficiencies or heat rates, correction has been made for the use of electrical energy for driving the necessary pumps, in order that the rates may be truly comparative. It is believed that the outstanding increase in efficiency attained by the utilization of my invention is obvious.

Since the waste heat is utilized to heat condensate, the size of the lake or artificial cooling pond required for operation may be reduced, because the quantity of heat to be dissipated is substantially reduced. The cost of installating such a system is less since many expensive items of equipment such as feed water heaters and makeup water evaporators are eliminated. Less area is necessary for the operation of my unit since several items of equipment otherwise necessary are eliminated and the size of the condenser can also be reduced, the latter reduction in temperature of the water passing through the condenser.

It will be appreciated that the principle of operation herein disclosed and described in detail may be applied in many other positions in other portions of the cycle and in series with various units when desired. Within limits obvious to those skilled in the art, the amount of heat saved by compression and heating of vapors existing at subatmospheric pressures by passage through a suitable jet is cumulative. An example of such a circuit is illustrated in Fig. 3, which is essentially similar to Fig. 1, except for that portion of the cycle between the discharge of heated condensate from the accumulator 61 and the introduction of such condensate to the heater 19. Similar numbers therefore have been employed on similar parts, and various of the items of the apparatus illustrated in Fig. 1 have been omitted to increase the clarity of the drawing. In this modification of my cycle, the heated condensate collecting in the bottom of the accumulator 61 is extracted by pumps 112, 112', and 112", interconnected by wires 113, 113', 113" with pumps 32, 32', 32" in such manner that each of the pumps 112, 112', 112" operates only when the corresponding pump 32, 32', 32" is in operation. The heated condensate is passed by pipes 114, 114', 114" from pumps 112, 112', 112" to jets 116, 116', 116", which discharge into the upper portion of an enclosed compartment 117. Exhaust steam from the condenser 12 for heating and compression in the jets 116, 116', 116" is supplied through a pipe 118 to the jets through check valves 119, 119', 119" which prevent loss of vacuum in the condenser when the jets are not in operation. The desired degree of subatmospheric pressure is maintained within the compartment 117 by a pipe 121, which communicates with the vacuum line 68 through a suitable control valve 122. The condensate and condensed exhaust steam discharged by the jets 116, 116', 116" into the compartment 117 is extracted therefrom by a pump 123, which discharges through a check valve 124 into the coil 126 of a heater 127, which may be similar or identical with the heater 19 previously described. Thus it may be seen that the latent heat contained in the exhaust steam extracted from the condenser through the pipe 118 is heated and condensed by passage through the jets 116, 116', and 116", and thus imparts its heat to the condensate, raising the temperature of the condensate and reducing the load on condenser 12. If desired, steam jet 103 may be incorporated in line 97, which supplies bled steam to the heater 127 and connected as previously described.

It should not be understood that my invention is confined to the use of turbines only, since many other steam-driven prime movers may be substituted for the turbine without material alteration of the structure or cycle herein disclosed, although the greatest economy will be noted when employed in connection with a turbine. Furthermore, in various other types of installations, such as on ships, there frequently exist heating or cooling circuits in which heated water is discharged in such manner as to dissipate the heat and the water without attempting to reclaim the heat thus dissipated. In such instances, it is obvious that the discharge from such apparatus may be injected as by a spray into the evaporator 35 for reclamation of this heat and the over all efficiency of the cycle thus even further increased.

I claim:
1. In a steam-driven prime mover system including a boiler, a condenser, and a turbine connected in a closed circuit, and a cooling water circuit for the condenser, a heat conservation apparatus including means providing first and second closed chambers, a jet pump connecting said chambers and having an inlet in said first chamber and an outlet in said second chamber, means for forcing condensate from said condenser through said jet pump to maintain a subatmospheric pressure in said first chamber, means for supplying water to said first chamber to be evaporated therein, means for maintaining a subatmospheric pressure in said second chamber higher than the vapor pressure of the water discharged by said jet pump, and means for returning to the condensate portion of said closed circuit water heated in said second chamber by operation of said jet pump.

2. In a steam-driven prime mover system including a heat conservation apparatus as set forth in claim 1, a generator driven by said turbine, a cooling water circuit for said generator, and means for supplying cooled water from said first chamber to the cooling water circuit of said generator.

3. Apparatus for heating condensate flowing in the regenerative heat cycle of a steam-driven prime mover discharging into a water cooled condenser with heat from discharged condenser cooling water having a low temperature head with respect to said condensate which includes a first container, a heat exchanger connected to receive discharged condenser cooling water for transferring heat from the prime mover's exhaust to the container, a condensate jet pump having a vapor inlet communicating with the container and an outlet outside said container, a second container communicating with said outlet, said jet pump being constructed and arranged to maintain a low subatmospheric pressure in said first container, means for introducing water into said first container in heat exchange relationship with the heat exchanger, and gas extraction means connected in communication with said second container for maintaining the second container at a subatmospheric pressure above the vapor pressure of the condensate and vapor mixture discharged into the second container by said jet pump.

4. Apparatus for use with a steam turbo-generator having a condenser circulating cooling water system, a generator air cooler circulating water system and a source of makeup water comprising a container, a condensate jet pump having a vapor inlet communicating with the container, means for discharging a jet of condensate through said pump for maintaining a subatmospheric pressure in said container, a heat exchanger in the container for connection with the discharge of the condenser circulating cooling water system, and sprays in the container for spraying water over the heat exchanger for evaporation to effect removal of heat from the water in the heat exchanger, one of the sprays being connected to the discharge of the generator air cooler circulating water system and another of the sprays being connected to the source of makeup water.

5. Apparatus for use in a closed steam system with a steam condenser having a circulating cooling water circuit comprising a first container, a heat exchanger in the first container for extracting heat from cooling water discharged by the steam condenser, a second container near the first container, a jet pump having a vapor inlet communicating with the first container and an outlet discharging into the second container, means for passing condensate from the condenser through the jet pump at a rate sufficient to maintain a subatmospheric pressure in the first container, gas extraction means connecting said second container in communication with the main condenser for maintaining a predetermined subatmospheric pressure condition in the second container, means in the first container for directing water in said first container into heat exchange relationship with the heat exchanger to effect cooling of the water in the heat exchanger, and an outlet in the second container for discharging heated condensate back to the closed system.

6. Apparatus for use with a steam turbo-generator having a condenser cooled by circulating water, a generator air cooler having a circulating cooling water system and a source of makeup water comprising a container, a condensate jet pump having a vapor inlet communicating with the container, means for passing a jet of condensate through said pump for maintaining a low subatmospheric pressure in said container, a heat exchanger in the container below the jet for passing heated water from the main condenser circulating cooling system through the container to be cooled, means for discharging water from the generator air cooler circulating water system into the container, and means for maintaining the level of water in the container normally above a predetermined height and for preventing the lowering of the level below a predetermined minimum.

7. Heat conservation apparatus for use in a regenerative heat cycle for a steam-driven prime mover comprising a shell having an evaporator chamber, a heat exchanger within the chamber having an inlet for connection with the condenser circulating cooling water circuit near its point of discharge from the main condenser and an outlet for connection to supply cooled water to said circuit for circulation, through the main condenser, a water jet exhauster having a vapor inlet communicating with the evaporator above the heat exchanger, means for passing a jet of condensate through said exhauster for lowering the pressure in said chamber and mean for supplying water into the evaporator chamber below the jet and into contact with the heat exchanger.

8. Heat conservation apparatus for use in a regenerative heat cycle for a steam-driven prime mover comprising an evaporator chamber, a heat exchanger within the chamber having an inlet for connection with the condenser circulating cooling water circuit near its point of discharge from the main condenser and an outlet for connection to supply cooled water to said circuit for circulation through the main condenser, a water jet exhauster having a vapor inlet communicating with the evaporator above the heat exchanger, means for passing a jet of condensate through the exhauster for producing a low subatmospheric pressure in said chamber, means for supplying water into the evaporator below the jet exhauster inlet and in contact with the exchanger, an accumulator for receiving the jet discharge, and means for maintaining a predetermined higher subatmospheric pressure in the accumulator than that in the evaporator.

9. Apparatus for use in a heat cycle of a steam-driven turbo-generator having a condenser, a cooling water system for the condenser, a generator air cooler having a circulating cooling water system and a source of makeup water comprising a first container, a jet pump having a vapor inlet within the first container and a discharge outlet outside said container, a second container in communication with said outlet, a pump for forcing condensate from the main condenser through said jet pump at a rate sufficient to maintain a low subatmospheric pressure in the first container, a heat exchanger in the container below said jet pump inlet for circulating at least a portion of the heated condenser cooling water through the first container, a spray within the container for connection with the discharge of the generator air cooler circulating water system, means for recycling water from the container to the generator air cooler, a second spray in the container for connection to a source of makeup water, means for passing heated condenser cooling water through the heat exchanger at all times during which makeup water is injected into said container, a third spray within the container for connection with a source of condensate, a low level float valve in the container for controlling introduction of condensate into the container, means connecting the second container with the main condenser for maintaining the predetermined subatmospheric pressure therein, said predetermined pressure being in excess of the vapor pressure of the mixture of condensate and vapor discharged into said second container by the jet, and means for discharging heated water from the second container.

10. Apparatus for use in a regenerative heat cycle for a steam-driven prime mover of the type having a condenser cooled by a circulating water system comprising an evaporator chamber having a heat exchanger therein having an inlet for connection to receive heated water from the condenser circulating cooling water system, a plurality of water jet pumps having vapor inlets communicating with said evaporator chamber for maintaining a low subatmospheric pressure in the evaporator chamber, means for forcing condensate through said jets, an accumulator chamber divided by vertical partitions into jet chambers and vacuum chambers between the jet chambers, each of said jets discharging into a separate jet chamber, means near the bottom of the accumulator interconnecting said jet and vacuum chambers, orifices near the top of the accumulator interconnecting said jet and vacuum chambers, and means for maintaining a subatmospheric pressure in said vacuum chambers greater than the pressure in the evaporator chamber.

11. Apparatus for use with a steam boiler and turbo-generator system having a condenser circulating cooling water system, a generator air cooler circulating water system and a source of makeup water comprising a container, a condensate jet pump having a vapor inlet communicating with said container for maintaining subatmospheric pressure therein, said pump including means for forcing a jet of condensate therethrough, a heat exchanger in said container for connection with the discharge of the condenser circulating cooling water system, a spray in said container connected to the discharge of the generator air cooler circulating water system for spraying water over said heat exchanger, conduit means between said condenser and said jet, and means for returning condensate from the discharge of said pump to the boiler.

12. The apparatus of claim 11 with the addition of a condensate heating and transport circuit from said container to the boiler, and means for heating the condensate in said last named circuit with bleed steam from said turbo-generator.

13. Apparatus for use with a steam turbo-generator including a steam generating boiler and having a condenser provided with a circulating cooling water system, a source of makeup water, a container, a condensate jet pump connected with said condenser to receive condensate therefrom and having a vapor inlet communicating with said container and an outlet for discharging fluid externally of said container for maintaining subatmospheric pressure in said container, said pump including means for forcing a jet of condensate therethrough, a heat exchanger in said container connected in communication with the discharge of the condenser circulating cooling water system, means for spraying makeup water over said heat exchanger whereby it vaporizes and is carried over by said condensate jet pump to increase the heat of the condensate on the discharge side thereof, and means for returning the heated condensate to the boiler.

References Cited in the file of this patent

UNITED STATES PATENTS

| | | | |
|---|---|---|---|
| 357,481 | Hancock | Feb. 8, | 1887 |
| 1,031,199 | Rigney | July 2, | 1912 |
| 1,090,485 | Lindmark | Mar. 17, | 1914 |
| 1,400,935 | Brown | Dec. 20, | 1921 |
| 1,573,582 | Smith | Feb. 16, | 1926 |
| 1,636,361 | Gibson | July 19, | 1927 |
| 1,741,605 | Baumann | Dec. 31, | 1929 |
| 1,742,580 | Church | Jan. 7, | 1930 |
| 1,804,616 | Hodgkinson | May 12, | 1931 |
| 1,852,640 | Baumann | Apr. 5, | 1932 |
| 1,869,190 | Ehrhart | July 26, | 1932 |
| 2,120,909 | Schmer | June 14, | 1938 |
| 2,278,085 | Ostermann | Mar. 31, | 1942 |
| 2,491,314 | Hopkirk | Dec. 13, | 1949 |

FOREIGN PATENTS

| | | | |
|---|---|---|---|
| 361,260 | Germany | Oct. 12, | 1922 |